UNITED STATES PATENT OFFICE.

WILLIAM CHARLES ALPERS, OF BAYONNE, NEW JERSEY.

SODIUM SULFOGUAIACOLATE AND PROCESS OF MAKING SAME.

SPECIFICATION forming part of Letters Patent No. 692,588, dated February 4, 1902.

Application filed May 8, 1901. Serial No. 59,319. (No specimens.)

*To all whom it may concern:*

Be it known that I, WILLIAM CHARLES ALPERS, a citizen of the United States, and a resident of Bayonne, in the county of Hudson and State of New Jersey, have invented certain new and useful Improvements in the Manufacture of Guaiacol Derivatives, of which the following is a full, clear, and exact description.

The object of the invention is to provide certain new and useful improvements in the manufacture of guaiacol derivatives, whereby sodium sulfo-guaiacolate or sodium ortho-guaiacol-sulfonate is produced.

In order to prepare the product, I proceed as follows: Molecular quantities of guaiacol ($C_6H_4.OCH_3OH$) and strong sulfuric acid ($H_2SO_4$) are mixed, and the resulting thick red mass is dissolved in water, and calcium carbonate ($CaCO_3$) is then added in excess to form calcium sulfo-guaiacolate, $$(C_6H_3.OCH_3.OH.SO_3)_2Ca,$$

and to neutralize any free sulfuric acid that may be present. The solution of calcium sulfo-guaiacolate is then filtered to free it from the precipitated calcium sulfate and treated with an equivalent quantity of sodium carbonate, ($Na_2CO_3$,) so that the calcium carbonate ($CaCO_3$) is precipitated and the sodium sulfo-guaiacolate ($C_6H_3.OCH_3.OH.SO_3Na$) remains in solution. The solution is then filtered and evaporated, and the sodium salt is deposited as a fine crystalline grayish-white powder. The product contains two different guaiacol-sulfonic salts appearing as a thick reddish syrupy mass. By treating this mass with ten times its quantity of absolute alcohol and cooling to zero grayish crystals are deposited, which by repeated washing with alcohol can be recrystallized from distilled water as perfect white fine crystals. The mother-liquor after distilling off the alcohol again appears as a syrupy mass of a deeper color than before.

The reactions above described are expressed by the following formulæ:

1. $C_6H_4.OCH_3.OH + H_2SO_4 =$
$C_6H_3.OCH_3OH.HSO_3 + H_2O.$

2. $2C_6H_3.OCH_3.OH.HSO_3 + CaCO_3 =$
$(C_6H_3.OCH_3.OH.SO_3)_2Ca + H_2O + CO_2.$

3. $(C_6H_3.OCH_3.OH.SO_3)_2Ca + Na_2CO_3 =$
$2(C_6H_3.OCH_3.OH.SO_3Na) + CaCO_3.$

Sodium sulfo-guaiacolate or sodium ortho-guaiacol-sulfonate is readily soluble in water, but sparingly soluble in alcohol and insoluble in ether. It has a slightly-bitter, followed by a somewhat sweetish, taste and is employed for the treatment of bronchial troubles, first stage of tuberculosis, and as an intestinal antiseptic. The sodium sulfo-guaiacolate if precipitated from water appears as a grayish-white powder, and if precipitated from alcohol it forms shining crystals. Its solution is colored violet upon the addition of tincture of chlorid of iron. A bead of the salt on platinum wire imparts a yellow color to the flame.

Having thus fully described my invention, I claim as new and desire to secure by Letters Patent—

1. As a new article of manufacture, the above-described sodium sulfo-guaiacolate, which appears as a fine crystalline grayish-white powder which dissolves readily in water but sparingly in alcohol, is insoluble in ether, and its solution is colored violet upon the addition of tincture of chlorid of iron.

2. The process for the manufacture of sodium sulfo-guaiacolate, consisting in treating guaiacol with sulfuric acid to form a thick red mass, subjecting this mass to the action of calcium carbonate, to form calcium sulfo-guaiacolate, precipitating the calcium sulfate, and then treating the solution with sodium carbonate, to precipitate calcium carbonate and to produce sodium sulfo-guaiacolate in solution containing two different guaiacol salts, and finally separating the two salts to produce sodium sulfo-guaiacolate in crystalline form.

In testimony whereof I have signed my name to this specification in the presence of two subscribing witnesses.

WILLIAM CHARLES ALPERS.

Witnesses:
THEO. G. HOSTER,
EVERARD B. MARSHALL.